June 15, 1943. F. R. MAXWELL 2,321,837
AIRPLANE AND CONTROL DEVICE THEREFOR
Filed Nov. 12, 1940 5 Sheets-Sheet 3
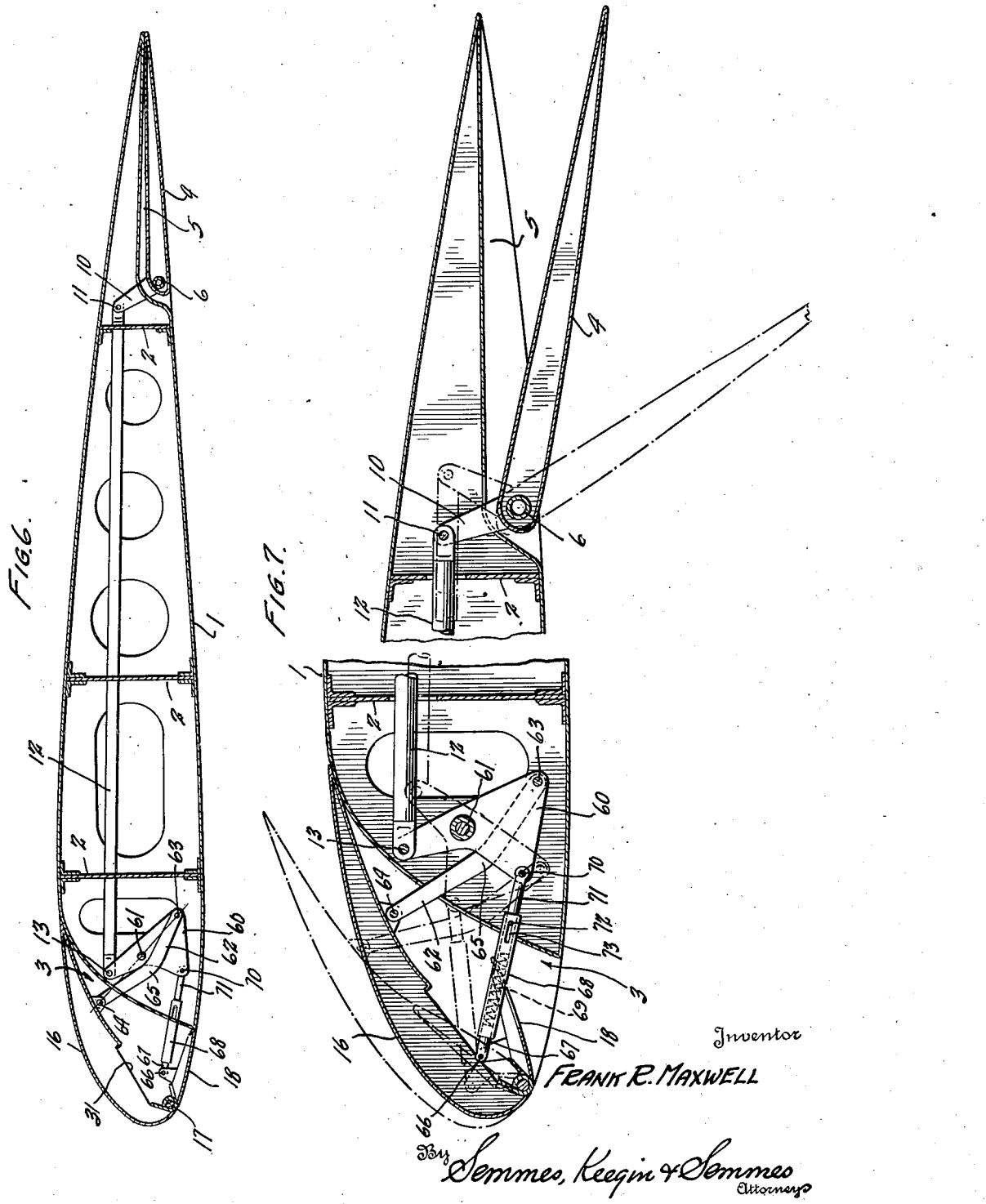
Inventor
FRANK R. MAXWELL
By Semmes, Keegin & Semmes
Attorneys

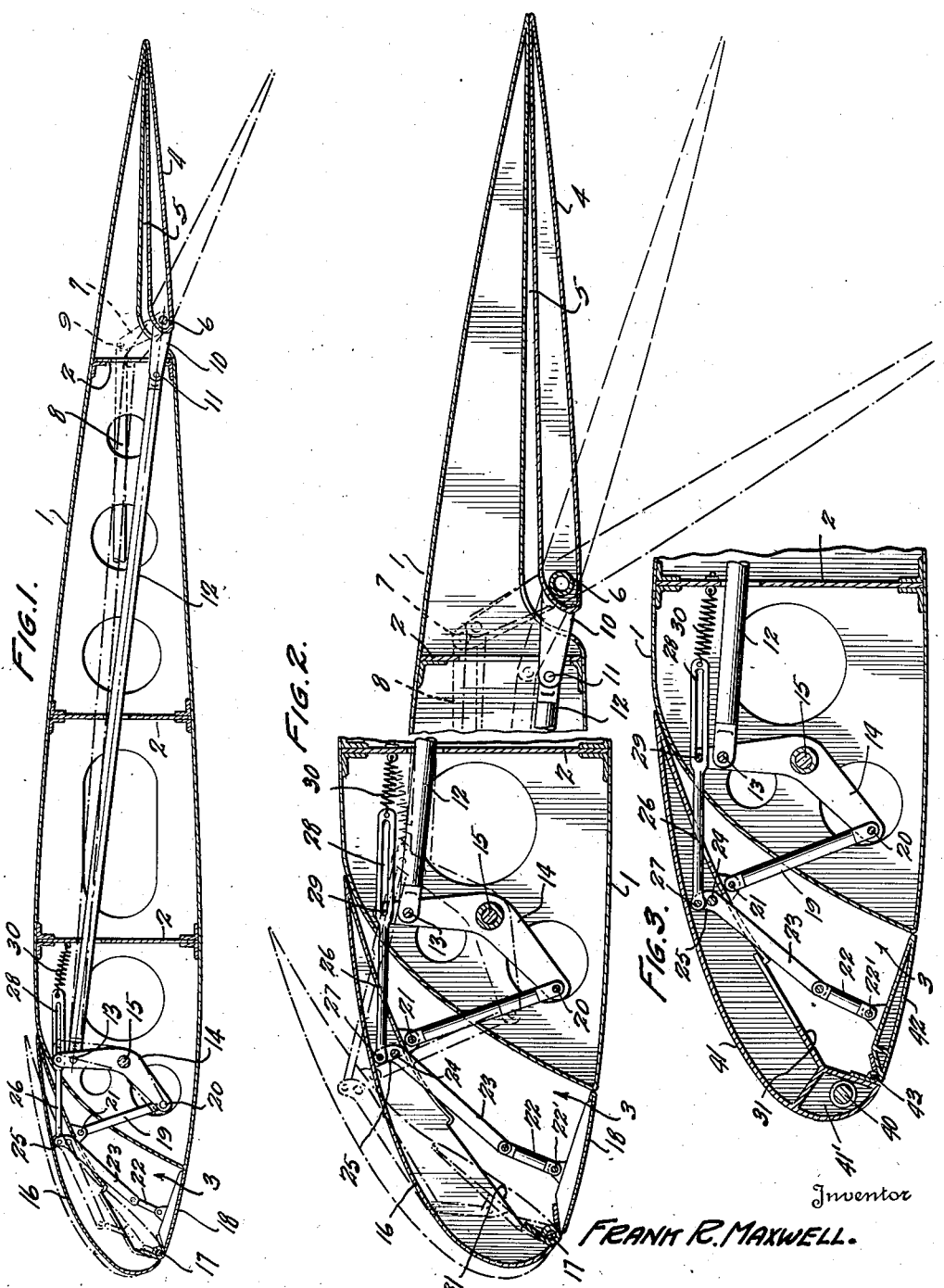

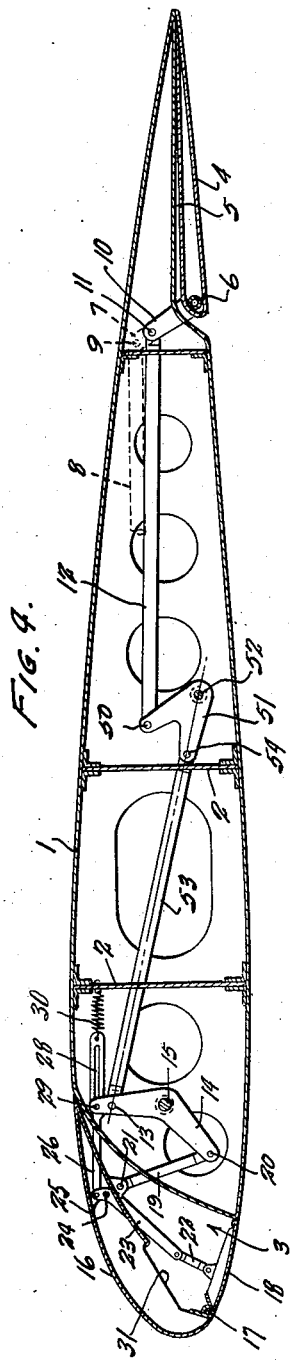

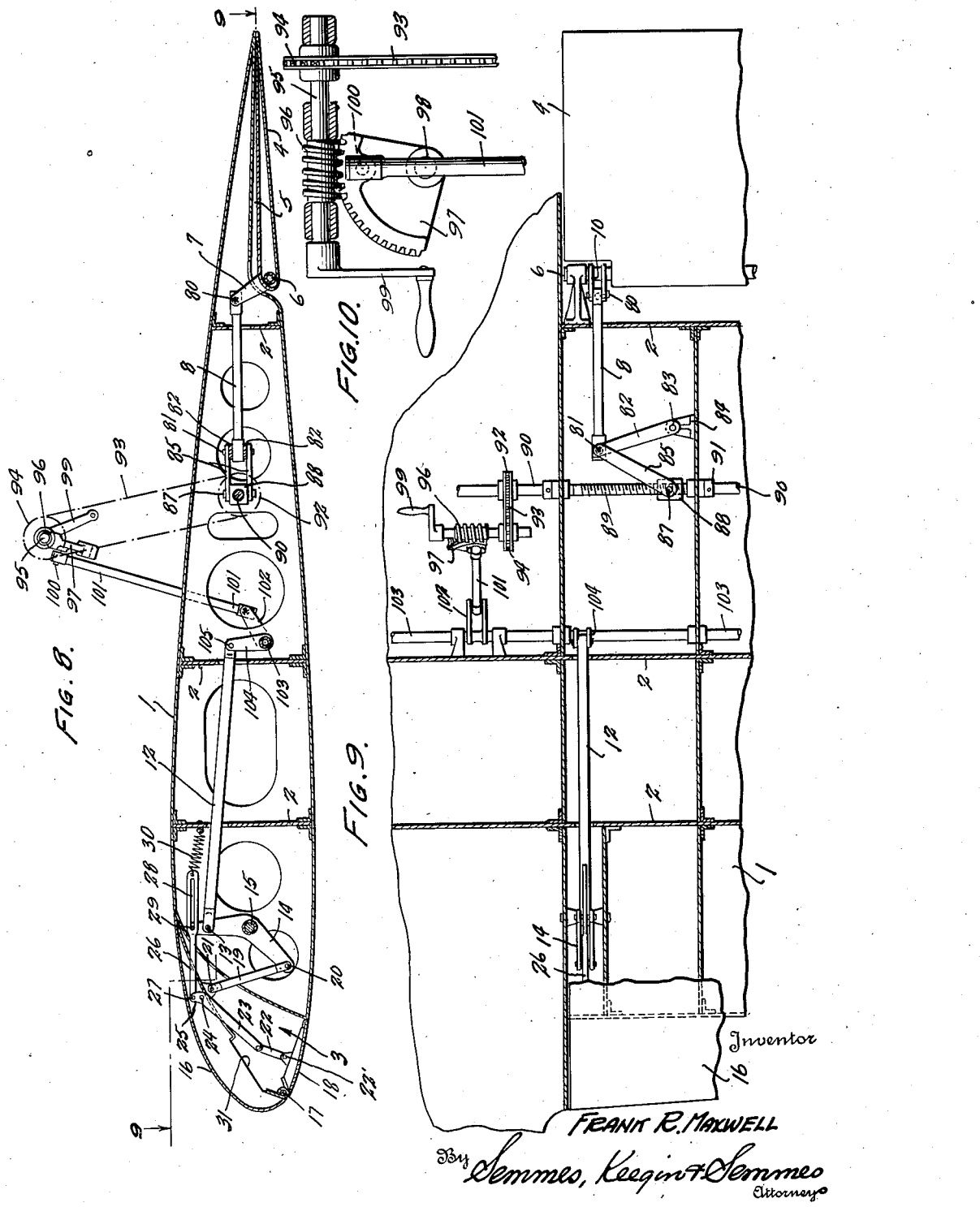

June 15, 1943.    F. R. MAXWELL    2,321,837
AIRPLANE AND CONTROL DEVICE THEREFOR
Filed Nov. 12, 1940    5 Sheets-Sheet 5

Inventor
FRANK R. MAXWELL.

By Semmes, Keegin & Semmes
Attorneys

Patented June 15, 1943

2,321,837

UNITED STATES PATENT OFFICE 2,321,837

AIRPLANE AND CONTROL DEVICE
THEREFOR

Frank R. Maxwell, Chester, Pa.

Application November 12, 1940, Serial No. 365,347

6 Claims. (Cl. 244—42)

My present invention relates to airplanes and more particularly has reference to an airplane wing having a novel slot and flap so interconnected that the opening movement of the slot is under positive control of the pilot at all times. More specifically, the slot is locked in its closed position against aerodynamic forces acting on the nose of the wing until the pilot moves the flap.

Numerous control devices have heretofore been incorporated in airplane wings to permit a high speed in flight and at the same time enable low speed takeoffs and permit the airplane to land in relatively small areas. Of course the idea of interconnecting a nose slot and a trailing edge flap is not novel, but to my knowledge an interconnected slot and flap combination in which the slot is positively locked against opening movement until the flap has begun to move has never been proposed. The disadvantages of having the nose slot open during certain stages of flight is believed readily apparent and any construction which will obviate such a step taking place is a real advance in the art.

An object of this invention is to provide an airplane wing with a slot and flap and the connection between the slot and flap having a lock which will positively prevent the slot from opening until the flap begins to move.

Another object of this invention is to provide an airplane wing with an interconnected slot and flap in which the slot is provided with upper and lower covers, the upper cover being locked against opening movement due to aerodynamic forces acting on the wing until the flap begins to move.

Yet a further object of this invention is to provide a wing having an interconnected slot and flap in which the connecting linkage is so arranged that it exerts its greatest mechanical force when the greatest aerodynamic forces are acting on the slot or flap.

And another object is to provide an airplane wing having a slot which extends through the wing adjacent to the leading edge thereof with covers for the upper and lower openings of said slot, said covers in their closed position conforming to the upper and lower contours of the wing and means to move the lower cover into contact with the upper cover to give an airfoil section to the upper cover upon initial movement of the upper cover and to maintain this airfoil section during all further movement of the upper cover, thereby affording optimum airflow through the slot.

Yet another object of this invention is to provide a novel nose slot for an airplane wing in which the upper and lower openings of the slot are closed by covers and in which the lower cover can open sufficiently to afford a smooth contour in the slot when the upper cover is partially opened and to thereafter remain in such position so that the contour of the slot will remain smooth as the upper cover is opened further.

And a still further object of this invention is to provide a slot for an airplane wing in which the upper and lower openings of the slot are closed by cover members, the upper cover member being pivoted to the nose of the wing and the lower cover member being hinged to the upper cover member.

Another object of the present invention is to provide a slot and flap combination for a wing in which the connecting linkage between the slot and flap is provided with a locking device either adjacent to the slot, adjacent to the flap, or intermediate the slot and flap to prevent the aerodynamic forces acting on the nose of the wing from opening the slot until the flap begins to move.

And an additional object of the present invention is to provide an interconnected slot and flap combination for an airplane wing wherein means adjacent to the pilot is provided to prevent the aerodynamic forces acting on the nose of the wing from opening the slot until the flap begins to move.

To achieve the foregoing and other objects, this invention comprises providing a slot adjacent to the leading edge of the wing and a flap near the trailing edge of the wing. The upper and lower openings of the slot are adapted to be closed by covers which conform to the contour of the upper and lower surfaces of the wing in their closed position. Linkage connects the flap to the upper cover and there is a connection to the lower cover which is operated by movement of the linkage. A control extends from the operating linkage to the cockpit or the fuselage of the airplane so that the pilot may actuate the slot and flap by a single control.

The linkage is of such nature that the flap may move through a small angle before the slot opens and the aerodynamic forces working on the leading edge of the wing cannot open the upper cover until the pilot has moved the flap. Furthermore, the connection to the lower cover will permit the lower cover to move into contact with the upper cover to give an airfoil section to the upper cover upon the initial movement of the upper cover and will maintain this airfoil section for all further movement of the upper cover, thus permitting maximum airflow through the slot.

In the drawings:

Figure 1 is a transverse sectional view of an airplane wing equipped with my novel nose slot and flap combination showing these parts in the closed position.

Figure 2 is a fragmental transverse sectional view of the layout shown in Figure 1 illustrating the different opening movement of the slot and flap, the slot and flap being shown in the closed position in the full lines.

Figure 3 is a fragmental transverse sectional view of the nose of a wing showing the lower slot cover pivoted to the upper cover, the slot being in the closed position.

Figure 4 is a transverse sectional view of an airplane wing equipped with another form of my invention.

Figure 5 is a fragmental transverse sectional view of the structure shown in Figure 4 showing the different opening movements of my slot and flap combination.

Figure 6 is a transverse sectional view of a still further form of my novel nose slot and flap combination.

Figure 7 is a fragmental transverse sectional view of the construction shown in Figure 6 illustrating the different movements of the slot and flap.

Figure 8 is a transverse sectional view of an airplane wing showing a still further form of my invention.

Figure 9 is a sectional view taken along the line 9—9 of Figure 8 looking in the direction of the arrows.

Figure 10 is a side elevational view of the operating unit for moving the slot and flap shown in Figure 8.

Figure 11:
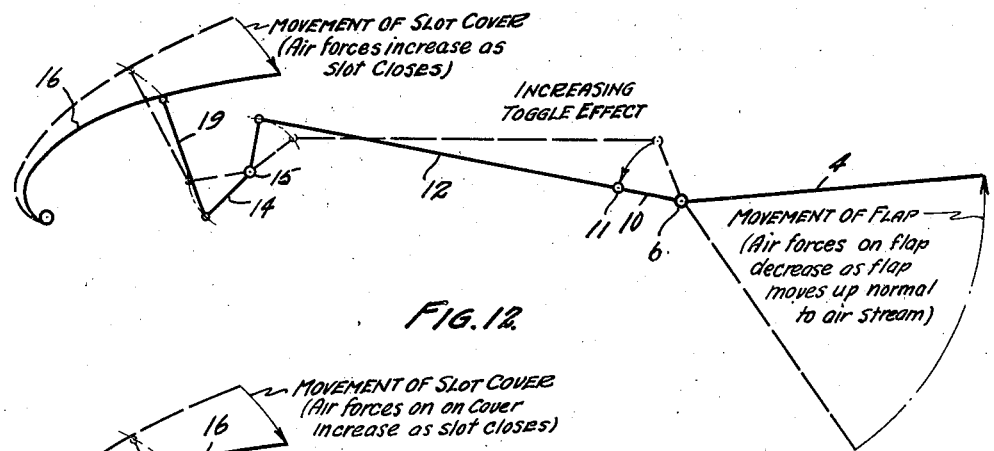
Figure 11 is a diagrammatic representation of the connecting linkage shown in Figure 1.

Referring to Figures 1 and 2 I have shown an airplane wing 1 of any suitable construction having internal spars 2, a slot 3 which extends through the wing adjacent to the leading edge thereof and a flap 4 provided near the trailing edge of the wing. The wing 1 is formed with a recess or well 5 in which the flap 4 is pivoted as shown at 6. An arm 7 is hinged to the flap and an operating rod 8 is pivoted to the free end of the arm 7 as indicated at 9. The rod 8 is suitably connected to the flap operating mechanism (not illustrated) located within the cockpit or fuselage of the airplane.

There is also attached to the flap 4 a short arm 10 to which is pivoted at 11 a long operating link or push rod 12. As clearly shown in Figure 1, the operating rod 12 extends to a point adjacent to the slot 3 and is pivoted at 13 to one arm of a bell crank 14 which is pivoted at 15 to the internal structure of the wing.

The upper opening of the slot 3 is adapted to be closed by a cover 16 which is hinged to the nose of the wing 1, as shown at 17. A second slot cover 18 for the lower opening of the slot is also hinged at the point 17. As clearly shown in the drawings, when the covers 16 and 18 are in their closed positions, they conform to the contour of the upper and lower surfaces of the wing 1, thereby affording an airfoil section.

A push rod 19 is pivoted to the other arm of the bell crank 14, as shown at 20. The free end of the rod 19 is pivoted to the undersurface of the cover 16, as shown at 21. A toggle link 22 is hinged to the lower cover 18, as shown at 22′, and an elongated lever 23 is pivoted to the link 22. The lever 23 is pivoted to the cover 16, as shown at 24, and is formed with a short offset portion 25. A rod 26 is pivoted to the offset portion 25, as shown at 27, and the rod 26 is further formed with a lost motion slot 28 in which is adapted to move a pin 29 carried by the bell crank 14. The rod 26 is attached to one of the internal spars by a tension spring 30.

It is thought apparent that since the pivot points 6, 11 and 15 are in line when the slot 3 and flap 4 are in their closed positions, it is not possible for the aerodynamic forces working on the leading edge of the wing to rock the bell crank 14 about its pivot 15 to cause the upper slot cover 16 to open. This is a very important feature of the present invention in that it will positively prevent the slot in the leading edge of the wing from being opened except when such opening is desired by the pilot of the airplane.

When the pilot operates his control to lower the flap it will be appreciated that the flap 4 may move through an angle of approximately 15° before the bell crank 14 begins to rock about its pivot 15 to open the cover 16. This is very desirable in that there are certain flight conditions where it is desired to have some flap movements without opening the slot. When the bell crank has rocked sufficiently to cause the push rod 19 to open the cover 16 slightly, the offset portion 25 and the link 23 will move the lower slot cover 18 into a well or recess 31 provided in the upper slot cover 16, as shown in Figure 2. This will give an airfoil section to the upper cover 16 and as the upper slot cover is moved further, the lower slot cover will remain in its nested position and thus afford optimum airflow through the slot 3.

Referring to Figure 3, I have shown a somewhat modified form of leading edge slot. The connections between the slot 3 and the flap 4 and the operating mechanism for opening and closing the slot are the same as the structural details illustrated in Figures 1 and 2. However, it will be noted that a hinge pin 40 which extends through the leading edge of the wing 1 supports a closure member 41 for the upper opening of the slot 3. The upper closure 41 is of stressed skin construction and may include a load carrying strength member, such as, a box beam 41′, as clearly shown in Figure 3. Obviously, other types of strength members may be used. A lower closure 42 for the slot is hinged to the box beam 41′, as shown at 43. (The lower cover may also be of stressed skin construction.) This slot operates in the same manner as the one shown in Figures 1 and 2.

In Figures 4 and 5, there is covered a still further form of my invention. In this modification, the operating link 12 is hinged at 50 to one arm of a bell crank 51 and the bell crank is pivoted at 52 to the internal structure of the wing 1. A second operating link 53 is pivoted to the other arm of the bell crank, as shown at 54. The opposite end of the link 53 is pivoted at 13 to the bell crank 14 which operates the upper slot cover 16.

It should be noted (Figure 4) that when the slot 3 and the flap 4 are in the closed positions the pivot points 13, 54 and 52 are in a straight line, thereby affording a lock, and it is not possible for the aerodynamic forces acting on the nose of the wing 1 to open the upper slot cover 16. Clearly, the slot 3 can only be opened when the pilot manipulates his controls to lower the flap 4 to rock the bell crank 51 about the pivot 52.

In Figures 6 and 7, there is shown another form of slot and flap combination in which the mechanism holding the upper slot cover 16 in its closed position is adjacent to the slot 3. In this form, it can be seen that the operating link 12 is pivoted at 13 to a lever 60 which is pivoted at 61 to the internal structure of the wing 1 at a point adjacent to the nose. A push rod 62 is pivoted to the lever 60 as shown at 63, and to the upper slot cover as shown at 64. The rod 62 is curved as indicated at 65 so that it will not interfere with the pivot point 61 of the lever 60.

Pivoted to the lower slot cover 18 as shown at 66 is a short rod 67. Secured to the end of the rod 67 is a sleeve 68 in which is disposed a helical spring 69. Pivoted at 70 to the lever 60 is a rod 71 which extends into the sleeve 68. A pin 72 provided on the rod 71 projects through a lost motion slot 73 provided in the sleeve 68. It is thought obvious therefore that when the lever 60 is moved about its pivot 61 by the lowering of the flap 4, the rod 71 will slide in the sleeve 68, compressing the spring 69, thereby causing the lower slot cover 18 to move to the broken line position shown in Figure 7 whereby a smooth contour is provided in the slot 3.

It should be further observed that the pivot points 13, 61 and 63 are in a substantially straight line when the slot 3 and the flap 4 are in their closed positions. As a result, it is not possible for the upper slot cover 16 to be opened by virtue of the forces acting on the wing 1.

By placing the straight line slot 13—61—63 adjacent the slot cover 16, the relatively great aerodynamic forces tending to open the slot will be confined to this structure and not be transmitted to the other control mechanism and surfaces.

In Figures 8 and 9, the locking unit for the slot 3 is adjacent to the pilot of the airplane.

In Figure 9, it will be noted that the flap horn 7 is pivoted at 80 to the push rod 8. The push rod 8 in turn is pivoted at 81 to a link 82 hinged at 83 to a supporting member 84 of the wing 1. A second link 85 is also pivoted at 81 to the rod 8 and at 87 to a nut 88. The nut 88 engages screw threads 89 provided on a shaft 90 journaled at 91 in the internal structure of the wing 1. A sprocket 92 is provided for the shaft and a chain 93 is trained over the sprocket 92. The chain also runs over a second sprocket 94 provided on a shaft 95 which is rotatably mounted in the cockpit or fuselage of the plane. The shaft 95 has formed therein a worm 96 which meshes with a segment 97 also supported in the cockpit as shown at 98. An operating handle 99 is provided for imparting movement to the shaft 95.

Attached to the segment 97, as indicated at 100, is a rod 101 which is pivoted to arms 102 carried by a shaft 103 journaled in the internal structure of the wing. Also attached to the shaft 103 are arms 104 to which is pivoted at 105 the operating link 12.

It is thought apparent that when the pilot rotates the shaft 95 by the handle 99, the shaft 90 will be rotated and the flap 4 will be lowered by virtue of the movement of the nut 87 along the screw threads 89. At the same time the arm 104 will be moved rearwardly, thus pulling the link 12 rearwardly, causing the bell crank 14 to be moved about the pivot 15, enabling the slot 3 to be opened. In view of the fact that the points 100, 98 and 102 are in a straight line, it is not possible for the aerodynamical forces working on the wing to open the upper slot cover 16.

Figure 12:
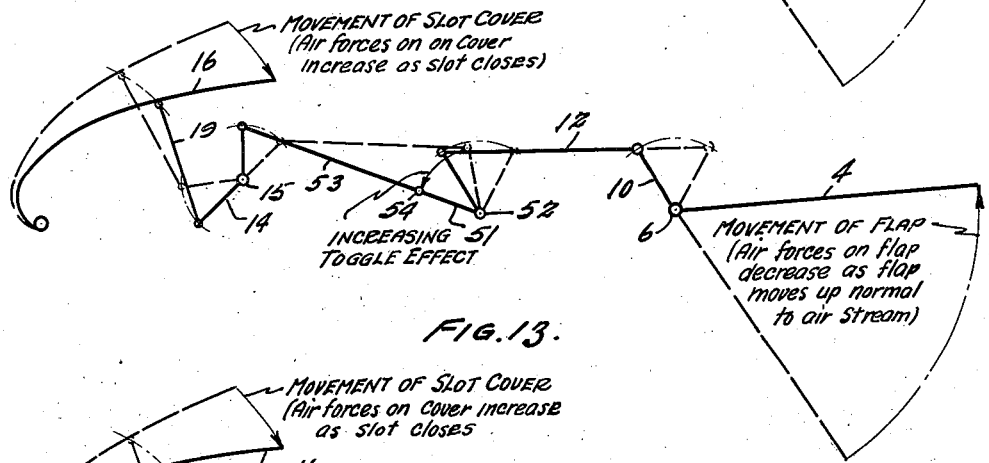
Figure 12 is a diagrammatic representation of the connecting linkage shown in Figure 4.
Figure 13:
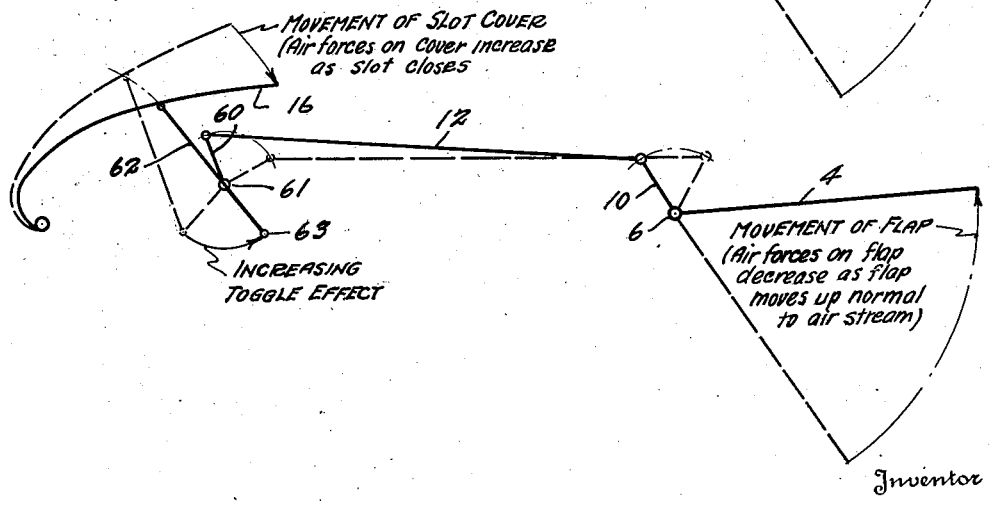
Figure 13 is a diagrammatic representation of the connecting linkage shown in Figure 6.

In Figures 11 to 13, I have shown diagrammatically the linkage that interconnects the slot and flap which tend to normally balance each other aerodynamically.

It will be noted that when the flap approaches its position normal to the airstream, the air forces affecting the flap movement decrease toward zero. Simultaneously, the slot is closing and the air forces tending to open the slot cover increase. During this movement, the toggle effect of the linkage is also increasing which compensates for the increased air force on the slot cover.

From the foregoing description, it will be appreciated that I have provided a wing having an interconnected slot and flap in which the connecting linkage is so arranged that it exerts its greatest mechanical force when the greatest aerodynamic forces are acting on the slot or flap. More specifically, as the flap and slot move, the toggle effect of the linkage tends to balance the aerodynamic forces acting on them. Moreover, the slot is provided with upper and lower covers having means to move the lower cover into contact with the upper cover to give an airfoil section to the upper cover upon initial movement of the upper cover and to maintain this airfoil section during all further movement of the upper cover. In addition, the upper cover under certain circumstances may be pivoted to the nose of the wing and the lower cover may be hinged to the upper cover. The linkage connecting the slot and flap may be provided with a locking device either near the slot, adjacent to the flap, or intermediate the slot and flap to prevent the aerodynamic forces acting on the wing from opening the slot until the flap begins to move.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. An airfoil comprising a main section having a slot adjacent its leading edge extending transversely to the line of flight, an upper cover for the slot formed as a unitary strength member and including a longitudinal spar providing a leading edge for the main section throughout the extension of the slot, and a pivot affording a connection between said spar and the main section.

2. An airfoil comprising a main section having a slot adjacent its leading edge extending transversely to the line of flight, an upper cover for the slot formed as a unitary strength member and including a longitudinal spar providing a leading edge for the main section throughout the extension of the slot, a pivot affording a connection between said spar and the main section, a lower cover for the slot and members forming operative connections between said covers whereby they may be rendered cooperatively operative.

3. An airfoil according to claim 2, characterized by the fact that the lower cover is pivotally supported from the upper cover.

4. An airfoil comprising a main section having a slot adjacent its leading edge extending transversely to the line of flight, an upper cover for the slot formed as a unitary strength member and including a longitudinal spar providing a leading edge for the main section throughout the extension of the slot and ribs supported by the spar and extending transversely of the upper slot cover and a pivot affording a connection between said spar and the main section.

5. An airfoil comprising a main section having a slot adjacent its leading edge extending transversely to the line of flight, an upper cover for the slot formed as a unitary strength member and including a longitudinal spar providing a leading edge for the main section throughout the extension of the slot, a pivot affording a connection between said spar and the main section, said cover in its extension rearwardly being of varying thickness and a support connected to said cover at a point to the rear of its point of greatest thickness.

6. An airfoil comprising a main section having a slot adjacent its leading edge extending transversely to the line of flight, an upper cover for the slot formed as a unitary strength member and including a longitudinal spar providing a leading edge for the main section throughout the extension of the slot and ribs supported by the spar and extending transversely of the upper slot cover, a pivot affording a connection between said spar and the main section, said cover in its extension rearwardly being of varying thickness and a support connected to said cover at a point to the rear of its point of greatest thickness.

FRANK R. MAXWELL.